Dec. 29, 1964   W. H. STOUT   3,163,361
MOBILE IRRIGATION SYSTEM
Filed April 16, 1962   2 Sheets-Sheet 2
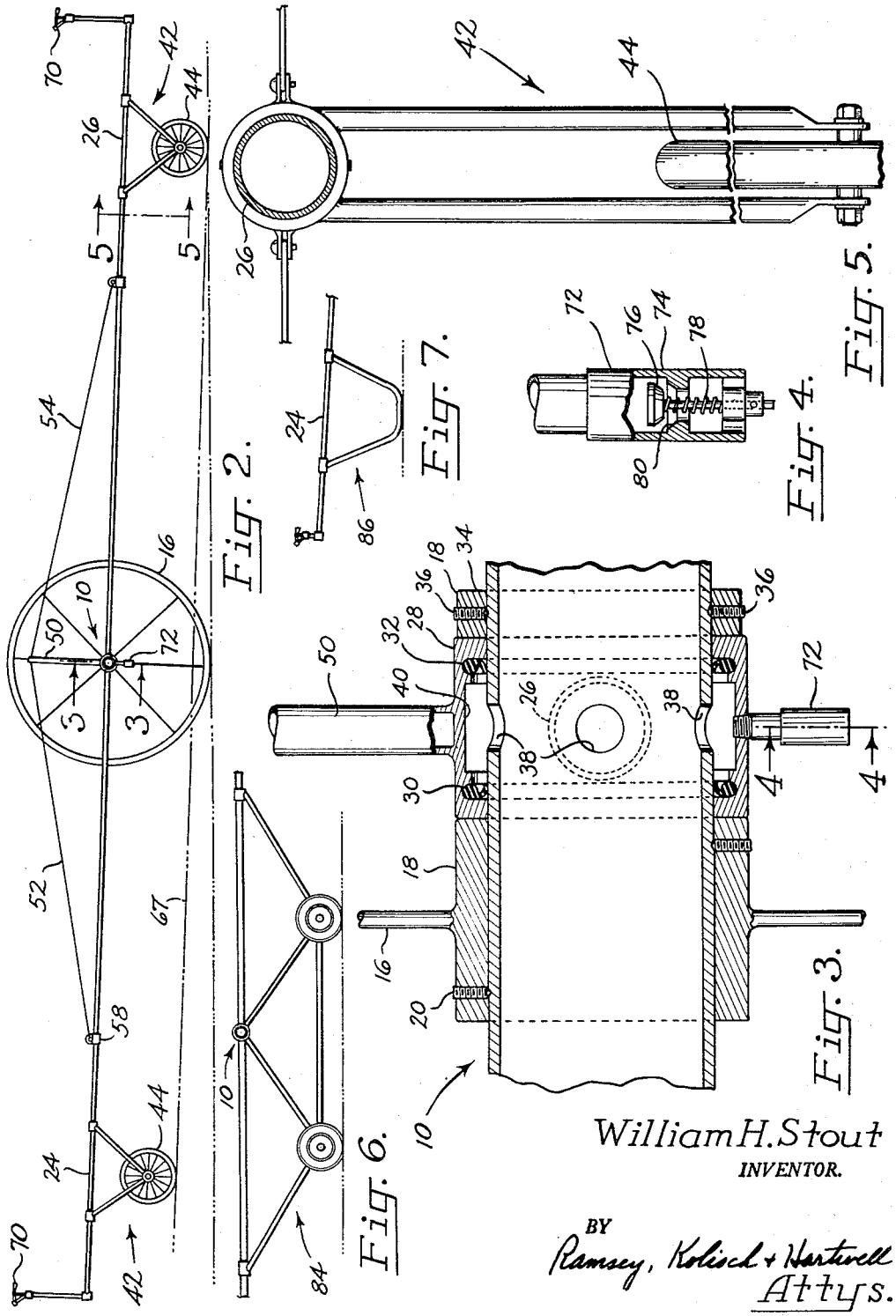
William H. Stout
INVENTOR.
BY
Ramsey, Kolisch + Hartwell
Attys.

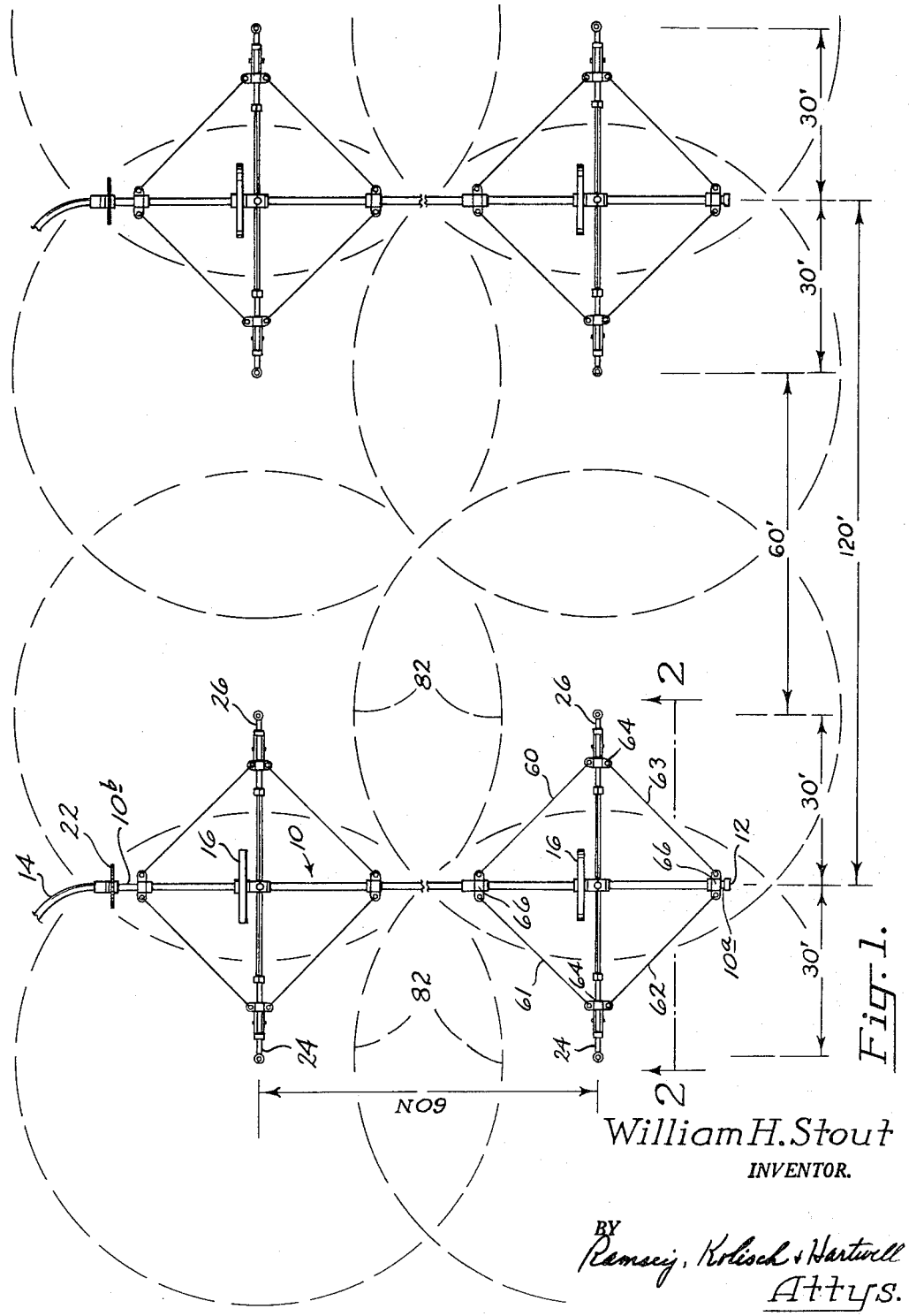

_United States Patent Office_

3,163,361
Patented Dec. 29, 1964

3,163,361
MOBILE IRRIGATION SYSTEM
William H. Stout, 223 N. Jessup St., Portland, Oreg.
Filed Apr. 16, 1962, Ser. No. 187,726
6 Claims. (Cl. 239—212)

This invention relates to irrigation systems, and more particularly to a mobile irrigation system constructed to be moved over the ground and having elevated outlets or nozzles for distributing water in different positions for the system.

A general object of the invention is to provide an improved irrigation system of such description, that is relatively simple and inexpensive to manufacture, but that nevertheless constitutes a highly effective system for irrigating large expanses of ground.

Another general object is to provide an irrigation system that combines the capability of irrigating a large expanse of ground, with good maneuverability, whereby the system may be shifted easily to different locations.

According to an embodiment of the invention, an elongated supply conduit is provided, with means for supporting the conduit for movement laterally over the ground. Projecting out to opposite sides of the conduit, and ordinarily substantially balanced thereon, are elongated conduit extensions, also referred to herein as hollow booms. These are connected to the conduit so that the interiors of the extensions or booms communicate with the interior of the conduit. The lateral extensions are also supported for movement over the ground conjointly with the conduit. The support for the extensions is such that with the conduit moved laterally over the ground in a given direction, there is nothing beneath the extensions that project in said direction (or "lead" the conduit) that constacts the ground. Those extensions that project from the conduit in the opposite direction (or "trail" the conduit) may have wheels or skids beneath them contacting the ground and supporting them in an elevated position. Because of the fact that the extensions that lead the conduit are devoid of anything beneath them contacting the ground, tendencies in these extensions to wander or veer from side to side (which would impede forward progress of the system) are eliminated. In those extensions that trail the conduit, supports beneath the extensions and in ground contact offer no problem.

Outlets or nozzles are provided in the extensions adjacent their outer ends. Outlets on opposite sides of the supply conduit are separated by a spacing that equals the spacing normally separating nozzles when plural nozzles are used to irrigate an expanse of ground. As a consequence of the above construction, in effect a double row of nozzles may be provided in a system supplied water by a single elongated reach of supply conduit or pipe. The system enlarges substantially the area that may be irrigated from what it is possible to irrigate using a single row of nozzles.

Thus, a more specific object is to provide an irrigation system, featuring an elongated supply pipe or conduit means, and extending out to either side lateral extensions (or hollow booms) receiving water from the pipe and mounted in such a way that they do not restrict travel of the conduit means laterally.

A further object is to provide such an irrigation system, featuring an elongated supply conduit means with lateral extensions connected thereto, where the system is laterally movable in either of opposite directions.

Another object is to provide an irrigation system, with extensions projecting from opposite sides of an elongated supply conduit, where the extensions on the side of the supply conduit that lead the conduit when the same is moved laterally are devoid of any support means thereunder contacting the ground.

More specifically, an object is to provide an irrigation system, including a supply conduit and lateral extensions, where the support therefor affords teetering of the system in such a manner that the extensions projecting to the leading side of the conduit when it is moved laterally are lifted, with the extensions that trail the conduit being lowered.

Another object of the invention is to provide a novel valve means in an irrigation system which facilitates teetering of the system when such is desired.

These and other objects and advantages are attained by the invention, and the same is described hereinbelow in conjunction with the accompanying drawings, wherein:

FIG. 1 is a plan view illustrating (somewhat schematically) an expanse of ground, and how the same may be irrigated using the irrigation system of the invention, with one change in the position of the system;

FIG. 2 is a cross-sectional view, on a somewhat larger scale, in a plane normal to an elongated supply conduit or pipe in the system, or in the plane indicated by the line 2—2 in FIG. 1;

FIG. 3 is a cross-sectional view, on an even larger scale, taken generally along the line 3—3 in FIG. 2, and illustrating the mounting of a wheel that supports the supply conduit, and other related structure;

FIG. 4 is a cross-sectional view, on yet a larger scale, illustrating a valve in the invention, the view being taken generally along the line 4—4 in FIG. 3;

FIG. 5 is a cross-sectional view, taken along the line 5—5 in FIG. 2, and on a somewhat larger scale than the scale of FIG. 2; and FIGS. 6 and 7 illustrate portions of modified forms of the invention.

Referring now to the drawings, and first of all to FIG. 1, the irrigation system of the invention in the embodiment illustrated comprises an elongated supply conduit means, or pipe, indicated at 10. The pipe preferably is made of a noncorrosible, light-weight metal, such as aluminum. As shown, the supply pipe is considerably shortened from the length it would have in the usual instance. For instance, it would not be uncommon to employ a pipe some quarter of a mile or so in length. The pipe has a relatively large diameter (typically a five- or six-inch diameter pipe might be employed). The function of the pipe is to carry water from a suitable source, to a plurality of outlets or nozzles provided along the length of the pipe, to be described hereinbelow in greater detail. End 10a of the pipe is closed off by a cap 12. Intake end 10b of the pipe is connected to a source of irrigation water, as by a suitable hose 14.

Means is provided for supporting the pipe for movement laterally in either of opposite directions over the ground. In the embodiment illustrated in FIGS. 1–5, this means comprises large-diameter wheels or supports 16, ordinarily spaced at regular intervals along the length of the pipe. The wheels illustrated are spoked wheels, and are mounted on the pipe by fixing their hubs 18 to the pipe (see FIG. 3) with screws, such as screw 20.

When irrigating a field, the irrigation system normally is positioned at a given location and remains stationary for a certain sprinkling period. When the adjacent ground is thoroughly irrigated, the system is moved with pipe 10 ordinarily moving laterally. Movement preferably should be possible in either of opposite lateral directions, whereby the system may be moved periodically back and forth over a given expanse of ground. Means, therefore, is provided for moving the pipe laterally, as described.

In the embodiment illustrated in FIGS. 1–5, the means for moving the pipe comprises a power-driven sprocket secured to the pipe, represented by sprocket 22 (see FIG. 1) fixed to end 10b of the pipe. Rotation of the sprocket is operable to rotate the pipe about its longitudinal axis. When this occurs, the pipe functions as a driven axle, and serves to rotate wheels 16 with the entire system shifting in the direction that the wheels are rotated. Any power-operated means may be provided for turning sprocket 22, such as the power take-off of a tractor (not shown) connected to the sprocket by a chain.

A feature of the invention is the provision of elongated conduit extensions or booms connected to pipe 10 that project laterally to opposite sides of the pipe. These extensions are illustrated in FIGS. 1 and 2, where extensions 24 are shown projecting laterally to the left-hand side of the supply pipe, and extensions 26 are shown projecting to the right-hand side of the supply pipe. Paired extensions are spaced at intervals along the length of the supply pipe, and each pair includes an extension 24 projecting to one side and an extension 26 projecting to the opposite side of the pipe. The two extensions 24, 26 in each pair are substantially balanced on either side of the pipe.

The extensions may be made of aluminum pipe the same as pipe 10. Ordinarily, the pipe of the extensions has a somewhat smaller diameter than supply pipe 10, as they need not carry the volume of water that the supply pipe carries.

A rotatable coupling connects the inner ends of a pair of extensions 24, 26 to pipe 10 with the interiors of the extensions communicating with the interior of pipe 10. Such a coupling is best illustrated in FIG. 3. Referring to FIG. 3, it will be seen that the coupling comprises a sleeve 28 encircling pipe 10. Providing a fluid-tight seal between the ends of the sleeve and the exterior of the pipe are annular seals 30, 32, that may be made of rubber or like material. Sleeve 28 is prevented from shifting axially on pipe 10 by hub 18 of a wheel 16 directly to one side thereof, and an anchoring ring 34 directly on the other side of the sleeve fixed to pipe 10 by means of screws 36. Ports 38 in the wall of pipe 10 allow water to flow from the pipe to an anular chamber 40 inside sleeve 28. Extensions 24, 26 have inner ends fixed to sleeve 28 and their interiors communicating with chamber 40.

Conduit extensions or booms 24, 26 include ground supports adjacent their outer ends. Thus, and referring to FIGS. 2 and 5, adjacent the outer end of each extension is a depending framework 42. Framework 42 has a wheel 44, which may resemble a bicycle wheel and the like, journaled on a bottom portion thereof. The wheels at such time as they contact the ground provide mobile support holding the ends of the extensions above the ground.

A construction is contemplated where each extension projecting to one side of the supply pipe functions to render a degree of support for the extension opposite. As will be described, during movement of the system, ground supports or wheels 44 under those extensions that lead pipe or conduit 10 are lifted clear of the ground, while the wheels 44 under the extensions that trail pipe 10 occupy a lowered position and are in ground contact. In such an instance, a cantilever support is provided for the extensions leading pipe 10 by the extensions that trail the pipe. Describing now this construction, each sleeve 28 that is part of the coupling connecting a pair of extensions with the supply pipe 10 includes a rod portion 50 projecting upwardly therefrom. This rod portion constitutes a bracket means in effect journaled on pipe 10. Mounted on the upper end of the rod portion and extending out to either side thereof are cables 52, 54. Cables 52, 54 have outer ends anchored in place adjacent the outer ends of the extensions by clasps 53. The cables function as tension means in the construction and, as can be seen in FIG. 2, when a right extension 26 is lowered the cables are tensed and operate to lift a left extension 24.

Also serving to make a pair of lateral extensions 24, 26 rigid on pipe 10 are cables 60, 61, 62 and 63 see FIG. 1). These cables have ends anchored adjacent the outer ends of the extensions (by clasps 64), and ends anchored on pipe 10 (by clasps 66).

Wheels 44 are shown with diameters considerably smaller than the diameters of wheels 16. The mounting for wheels 44 is such that a plane passing tangentially across the bottoms of the wheels (such as plane 67 in FIG. 2) subtends a portion of the wheel 16 thereinbetween. Put in another way, the base of the wheel 16 projects below this plane. Because of this, a teetering action is provided, and with one of the wheels 44 in contact with the ground (and actually providing ground support), the wheel 44 opposite is elevated from the ground. This teetering capability is relied upon to facilitate movement of the system in either of opposite directions, when a change in the position of the irrigation system is desired.

Irrigation water is distributed by the system through nozzles or outlets 70 mounted on the ends of the extensions. These nozzles may be conventional in construction, and thus are described only generally. The nozzles are mounted in positions elevated somewhat from the ends of the extensions directly therebelow.

A drain valve mechanism is included adjacent the bottom of each sleeve 28. The valve mechanism is indicated in FIGS. 2, 3 and 4 at 72. The valve mechanism comprises a housing 74 connected to the sleeve with the interior of the housing communicating with chamber 40. Within the valve housing is a valve element 76, biased by a spring 78 to a position opening a port 80. With water under pressure in pipe 10, the valve element is forced by the water to a closed position. In the absence of water under pressure, spring 78 urges the valve element to its raised position (the position shown in FIG. 4), and in this position water may flow out of chamber 40 through port 80.

The drain valve mechanisms may be used when laterally moving the system to keep the set of extensions that lead the system in their proper elevated position, as will be explained below.

Explaining now how the irrigation system may be used to irrigate an expanse of ground, and now referring to FIG. 1, let it be assumed that the system occupies the position shown for the system at the left of the drawing. Let it also be assumed that the system had previously been moved from right to left in FIG. 1, and that extensions 24 at the left are in an elevated position, as shown in FIG. 2. If water under pressure were now admitted to supply pipe 10, the pressure of the water would shift elements 76 to a position closing ports 80, and the water in the system would be distributed over the ground through nozzles 70. The area covered by the water would be substantially as indicated by the dashed circular patterns 82 at the left of the drawing.

Let it now be assumed that the ground immediately around the system has been irrigated, and that the supply of water to pipe 10 has been shut off. Let it also be assumed that it is now desired to shift the system to the right in FIG. 1, to the position shown at the right of the drawing. To do this, an operator would pass down the length of the system, and press down on each left-hand extensions 24, thus to teeter the system and to place ground wheels 44 under extensions 24 in engagement with the ground, while raising wheels 44 and extensions 26. With the system teetered over to this new position, water is prevented from flowing out of lowered extensions 24, by reason of the elevated positions of nozzles 70 connected to these extensions. Water, however, may drain from elevated extensions 26 through drain valve mechanisms 72. As a result, the extensions on the right are made lighter than the extensions on the left. The extensions on the left (that are weighted with water) then serve to provide a cantilever support for the extensions on the right.

Pipe 10 may now be rotated to advance the entire system to the right. On reaching the new position, water may again be supplied, under pressure, to pipe 10. Sprinkling of water will now occur as in the first instance.

On completely irrigating a field, and should it be desired to return the irrigation system to its original position, this is easily accomplished by pushing down on the extensions on the right of pipe 10, to raise the extension on the left of the pipe. After proper drainage of water from the extensions on the left, the pipe may be rotated in the opposite direction with the system then advancing to the left.

It will be noted that the extensions that trail the pipe are pulled along and thus easily follow the pipe. Those extensions that are in front, or lead the pipe, are raised to prevent wandering or veering therein.

Various modifications of the invention are possible. In FIG. 6, a structure 84 is illustrated for supporting pipe 10 above the ground. Plural ones of such structures may be provided in place of wheels 16. In such an embodiment, lateral movement of pipe 10 could be accomplished by a tractor pulling on pipe 10.

In FIG. 7, skids are shown that may replace wheels 44 at the ends of the various extensions. Those extensions that occupy a lowered position are always pulled, and thus skids provide a simple structure for supporting the extensions while accommodating such movement.

It should be noted that using the system disclosed, for one setting of the system twice as large an area may be irrigated than it is possible to irrigate with a system having only a single row of nozzles. This greater capacity is possible without any substantial increase in the cost of the equipment, and with maneuverability maintained.

While embodiments of the invention have been described, various modifications and variations are possible without departing from the invention. It is desired to cover all such modifications and variations that would be apparent to one skilled in the art, and that come within the scope of the appended claims.

It is claimed and desired to secure as Letters Patent:

1. A teeterable mobile irrigation system with laterally extending irrigation booms comprising
   an elongated fluid-carrying supply conduit which is rotatable about its longitudinal axis,
   plural supports for the supply conduit spaced at intervals along the length thereof and supporting the supply conduit above the ground, said supports being actuatable to produce movement of said supply conduit laterally,
   a driving connection between the supply conduit and said supports whereby rotation of the conduit actuates the supports to produce lateral movement of the supply conduit,
   a set of elongated hollow fluid-carrying booms with ground-supported outer portions projecting laterally out to one side of the supply conduit,
   another set of elongated hollow fluid-carrying booms having outer portions freely suspended above the ground projecting laterally out to the opposite side of the supply conduit,
   rotatable couplings connecting the supply conduit and booms producing a fluid connection therebetween and accommodating rotation of the supply conduit about its longitudinal axis relative to the booms, and
   means joining the booms on one side of the conduit with the booms on the other side whereby the outer portions of said other set of booms may be moved downwardly to place them in a ground-supported position, with outer portions, of the first set of booms then moving upwardly to become suspended freely above the ground.

2. The irrigation system of claim 1, wherein the fluid-carrying booms have outlets for irrigation water adjacent their outer extremities including elevated discharge openings, and which further comprises valve means in the system adjacent where the supply conduit and booms are connected accommodating the drainage of water from the booms on one side of the conduit without water draining from the booms on the other side, this being effective to produce an unbalance in the system promoting teetering of the system.

3. A teeterable mobile irrigation system with laterally extending irrigation booms comprising
   an elongated fluid-carrying supply conduit which is rotatable about its longitudinal axis,
   plural support wheels spaced at intervals along the length of the supply conduit having the supply conduit extending through the centers thereof,
   means connecting the supply conduit and support wheels whereby on rotation of the conduit the support wheels are rotated and the conduit is moved laterally,
   a set of elongated hollow fluid-carrying booms with ground-supported outer portions projecting laterally out to one side of the supply conduit,
   another set of elongated hollow fluid-carrying booms having outer portions freely suspended above the ground projecting laterally out to the opposite side of the supply conduit,
   rotatable couplings connecting the supply conduit and booms producing a fluid connection therebetween and accommodating rotation of the supply conduit about its longitudinal axis relative to the booms, and
   means joining the booms on one side of the conduit with the booms on the other side, whereby the outer portions of said other set of booms may be moved downwardly to place them in a ground-supported position, with outer portions of the first set of booms them moving upwardly to become suspended freely above the ground.

4. A teeterable mobile irrigation system with laterally extending booms comprising
   an elongated fluid-carrying supply conduit,
   support wheels for the conduit mounted on the conduit with the conduit passing through the centers of the wheels and with said wheels providing teeterable supports for the system,
   first and second hollow fluid-carrying booms projecting laterally out to opposite sides of the conduit,
   means interconnecting the booms whereby upon teetering of the system, the boom on one side is lowered accompanied with raising of the boom on the other side,
   said system having one position where said booms on both sides of the conduit project out laterally to opposite sides while being freely suspended over the ground and entirely supported by the conduit and the wheels mounted thereon,
   the booms on each side of the conduit including means spaced outwardly from the conduit adapted to contact the ground and render support on teetering of the system to place the boom lower than the boom opposite, and
   means joining the interior of the booms and the interior of the conduit whereby fluid communication is established therebetween.

5. A teeterable mobile irrigation system with laterally extending irrigation booms comprising
   an elongated fluid-carrying supply conduit,
   plural support wheels for the conduit mounted on the conduit with the conduit passing through the centers of the wheels,
   hollow boom structure for carrying irrigation water mounted on the conduit and in fluid communication with the conduit including boom portions projecting out laterally to opposite sides of the conduit,
   means rotatably mounting the boom structure on the conduit accommodating swinging of the boom structure about the longitudinal axis of the conduit, said boom structure including a balanced pair of booms on either side of the conduit and connected thereto teeterable about the conduit and interconnected whereby when one teeters downwardly the other teeters upwardly, each boom of said pair including means adjacent its outer extremities for contacting the ground and providing support upon it being lowered toward the ground by teetering movement.

6. The irrigation system of claim 5, wherein said pair of booms includes a sprinkling device for each boom mounted adjacent the outer end of each boom, and said sprinkling device is elevated above the boom where it is mounted, and which further comprises valve means in the system adjacent the connection of the pairs of booms with the supply conduit to accommodate the drainage of water from the booms, such drainage, with one boom of the pair lowered and the other raised, occurring from the raised boom only, and the valve means thus promoting unbalance in the system.

References Cited in the file of this patent

UNITED STATES PATENTS

| | | |
|---|---|---|
| 2,741,510 | McCulloch | Apr. 10, 1956 |
| 2,834,634 | Johnson | May 13, 1958 |
| 2,892,466 | Stilwell et al. | June 30, 1959 |
| 2,896,858 | Price | July 28, 1959 |

FOREIGN PATENTS

| | | |
|---|---|---|
| 26,537 | Denmark | Aug. 18, 1920 |
| 374,330 | Germany | Apr. 23, 1923 |
| 641,779 | Germany | Feb. 12, 1937 |